US010484854B2

United States Patent
Park et al.

(10) Patent No.: US 10,484,854 B2
(45) Date of Patent: Nov. 19, 2019

(54) VEHICLE AND METHOD FOR CONTROLLING EMERGENCY CALL OF THE VEHICLE

(71) Applicants: Hyundai Motor Company, Seoul (KR); Kia Motors Corporation, Seoul (KR)

(72) Inventors: Yunjoong Park, Seoul (KR); Dong Jin Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/797,083

(22) Filed: Oct. 30, 2017

(65) Prior Publication Data
US 2018/0376301 A1    Dec. 27, 2018

(30) Foreign Application Priority Data

Jun. 23, 2017 (KR) .......................... 10-2017-0079585

(51) Int. Cl.
| H04M 9/00 | (2006.01) |
| H04W 4/90 | (2018.01) |
| H04W 4/04 | (2009.01) |
| H04W 64/00 | (2009.01) |
| H04W 76/50 | (2018.01) |
| H04W 76/25 | (2018.01) |
| H04W 4/44 | (2018.01) |

(52) U.S. Cl.
CPC .............. *H04W 4/90* (2018.02); *H04W 4/04* (2013.01); *H04W 4/44* (2018.02); *H04W 64/006* (2013.01); *H04W 76/25* (2018.02); *H04W 76/50* (2018.02)

(58) Field of Classification Search
CPC ... H04W 4/22; H04W 76/007; H04W 76/045; H04B 1/082
See application file for complete search history.

(56) References Cited

U.S. PATENT DOCUMENTS

| 8,781,442 B1 * | 7/2014 | Link, II ................. G08G 1/205 |
| | | 455/411 |
| 9,380,608 B1 * | 6/2016 | Bowles ................. H04W 76/50 |
| 2005/0288017 A1 * | 12/2005 | Doumenc ......... H04W 36/0083 |
| | | 455/435.3 |

(Continued)

FOREIGN PATENT DOCUMENTS

| KR | 2009-0084391 A | 8/2009 |
| KR | 10-0946991 B1 | 3/2010 |
| KR | 10-1496465 B1 | 2/2015 |

*Primary Examiner* — Khalid W Shaheed
(74) *Attorney, Agent, or Firm* — Mintz Levin Cohn Ferris Glovsky and Popeo, P.C.; Peter F. Corless; Carolina E. Säve

(57) ABSTRACT

A method for controlling an emergency call signal generated from a vehicle includes: acquiring network coverage information of a plurality of communication networks; storing the network coverage information for each link in a map of a navigation device installed in the vehicle; calculating at least one parameter for selecting a communication network needed to maintain continuity of the emergency call signal when an emergency call button of the vehicle is manipulated; selecting a communication network needed to maintain continuity of the emergency call signal based on the at least one calculated parameter; and connecting the emergency call signal through the selected communication network.

12 Claims, 9 Drawing Sheets

(56) References Cited

U.S. PATENT DOCUMENTS

| | | | |
|---|---|---|---|
| 2008/0177461 A1* | 7/2008 | Blackwood | G01C 21/26 |
| | | | 701/532 |
| 2012/0252364 A1* | 10/2012 | Inabathuni | G08C 17/02 |
| | | | 455/41.2 |
| 2014/0199962 A1* | 7/2014 | Mohammed | H04M 15/70 |
| | | | 455/406 |
| 2014/0257695 A1 | 9/2014 | Annapureddy et al. | |

* cited by examiner

FIG. 6

| REGION | 2/3G | LTE |
|--------|------|-----|
| LINK 1 | 30 | 100 |
| LINK 2 | 0 | 50 |
| ... | ... | 0 |
| LINK N | ... | ... |

VEHICLE AND METHOD FOR CONTROLLING EMERGENCY CALL OF THE VEHICLE

CROSS-REFERENCE TO RELATED APPLICATION

This application claims the benefit of priority to Korean Patent Application No. 10-2017-0079585, filed on Jun. 23, 2017 in the Korean Intellectual Property Office, the disclosure of which is incorporated herein by reference as if fully set forth herein.

BACKGROUND

1. Technical Field

Embodiments of the present disclosure relate generally to vehicular technologies, and more particularly, to a vehicle having an emergency call system and a method for controlling the same.

2. Description of the Related Art

Emergency call systems allow a vehicle to wirelessly make an emergency phone call to a remote site enabling an emergency call system to respond to an emergency situation. In the emergency call system, a user (e.g., driver, passenger, etc.) may generate an emergency call by manipulating an emergency call button mounted in the vehicle when an emergency situation occurs. The emergency call system then makes a phone call to a predetermined entity so the user can request assistance.

Conventional emergency call systems utilize a wireless communication network. Because there are various kinds of wireless communication networks, the outgoing emergency call may be interrupted when the vehicle moves from one wireless communication network to another. As a result, additional user manipulation for reconnection of the emergency call is needed, resulting in greater user inconvenience, or worse, the user is unable to receive the necessary help.

SUMMARY

It is an aspect of the present disclosure to provide a vehicle with an emergency call system and a method for controlling the same, which effectively select and change a communication network even when the vehicle connected to the emergency call system is traveling, resulting in prevention of emergency call interruption.

Additional aspects of the invention will be set forth in part in the description which follows and, in part, will be apparent from the description, or may be learned by practice of the invention.

In accordance with embodiments of the present disclosure, a method for controlling an emergency call signal generated from a vehicle includes: acquiring network coverage information of a plurality of communication networks; storing the network coverage information for each link in a map of a navigation device installed in the vehicle; calculating at least one parameter for selecting a communication network needed to maintain continuity of the emergency call signal when an emergency call button of the vehicle is manipulated; selecting a communication network needed to maintain continuity of the emergency call signal based on the at least one calculated parameter; and connecting the emergency call signal through the selected communication network.

The at least one parameter may be at least one of: a network electric field value of a current position of the vehicle, a numerical value of a network coverage map, a travel direction of the vehicle, and an average speed of the vehicle.

The method may further include: selecting a communication network having a non-zero numerical value of the network coverage map.

The method may further include: when no communication network having a non-zero numerical value of the network coverage map is present, selecting a communication network having a maximum average value of the numerical value of the network coverage map.

The method may further include: when the navigation device provides a navigation service to a destination, selecting a communication network through numerical and mapping resultant values for each link in the map of the navigation device along a travel route directed by the navigation device.

The method may further include: when the navigation device does not provide a navigation service to a destination, predicting a future position of the vehicle after lapse of a predetermined time based on a current position of the vehicle; and selecting a communication network through numerical and mapping resultant values for each link in the map of the navigation device at the predicted future position.

The method may further include: regenerating the emergency call signal when a telephone conversation resulting from the emergency call signal is interrupted.

Furthermore, in accordance with embodiments of the present disclosure, a vehicle includes: a navigation device including a controller and providing a navigation service; and a telematics unit enabling wireless communication with the vehicle. The controller acquires network coverage information of a plurality of communication networks, stores the network coverage information for each link in a map of the navigation device, calculates at least one parameter for selecting a communication network needed to maintain continuity of an emergency call signal generated by the vehicle when an emergency call button of the vehicle is manipulated, selects a communication network needed to maintain continuity of the emergency call signal based on the at least one calculated parameter, and connects the emergency call signal through the selected communication network.

The at least one parameter may be at least one of: a network electric field value of a current position of the vehicle, a numerical value of a network coverage map, a travel direction of the vehicle, and an average speed of the vehicle.

The controller may select a communication network having a non-zero numerical value of the network coverage map.

When no communication network having a non-zero numerical value of the network coverage map is present, the controller may select a communication network having a maximum average value of the numerical value of the network coverage map.

When the navigation device provides a navigation service to a destination, the controller may select a communication network through numerical and mapping resultant values for each link in the map of the navigation device along a travel route directed by the navigation device.

When the navigation device does not provide a navigation service to a destination, the controller may predict a future position of the vehicle after lapse of a predetermined time based on a current position of the vehicle, and selects a communication network through numerical and mapping resultant values for each link in the map of the navigation device at the predicted future position.

The controller may regenerate the emergency call signal when a telephone conversation resulting from the emergency call signal is interrupted.

Furthermore, in accordance with embodiments of the present disclosure, a method for controlling an emergency call signal generated from a vehicle includes: acquiring network coverage information of a plurality of communication networks; storing the network coverage information for each link in a map of a navigation device installed in the vehicle; calculating at least one parameter for selecting a communication network needed to maintain continuity of the emergency call signal when an emergency call button of the vehicle is manipulated; selecting a communication network needed to maintain continuity of the emergency call signal based on the at least one calculated parameter; connecting the emergency call signal through the selected communication network; and regenerating the emergency call signal when a telephone conversation resulting from the emergency call signal is interrupted. The at least one parameter is at least one of: a network electric field value of a current position of the vehicle, a numerical value of a network coverage map, a travel direction of the vehicle, and an average speed of the vehicle.

Furthermore, in accordance with embodiments of the present disclosure, a vehicle includes: a navigation device including a controller and providing a navigation service; and a telematics unit enabling for wireless communication with the vehicle. The controller acquires network coverage information of a plurality of communication networks, stores the network coverage information for each link in a map of the navigation device, calculates at least one parameter for selecting a communication network needed to maintain continuity of an emergency call signal generated by the vehicle when an emergency call button of the vehicle is manipulated, selects a communication network needed to maintain continuity of the emergency call signal based on the at least one calculated parameter, connects the emergency call signal through the selected communication network, and regenerates the emergency call signal when a telephone conversation resulting from the emergency call signal is interrupted. The at least one parameter is at least one of: a network electric field value of a current position of the vehicle, a numerical value of a network coverage map, a travel direction of the vehicle, and an average speed of the vehicle.

BRIEF DESCRIPTION OF THE DRAWINGS

These and/or other aspects of the present disclosure will become apparent and more readily appreciated from the following description of the embodiments, taken in conjunction with the accompanying drawings of which:

FIG. 6 is a table illustrating resultant values that are numerically changed and mapped for each link in a travel route on a navigation map;

Figure 1:
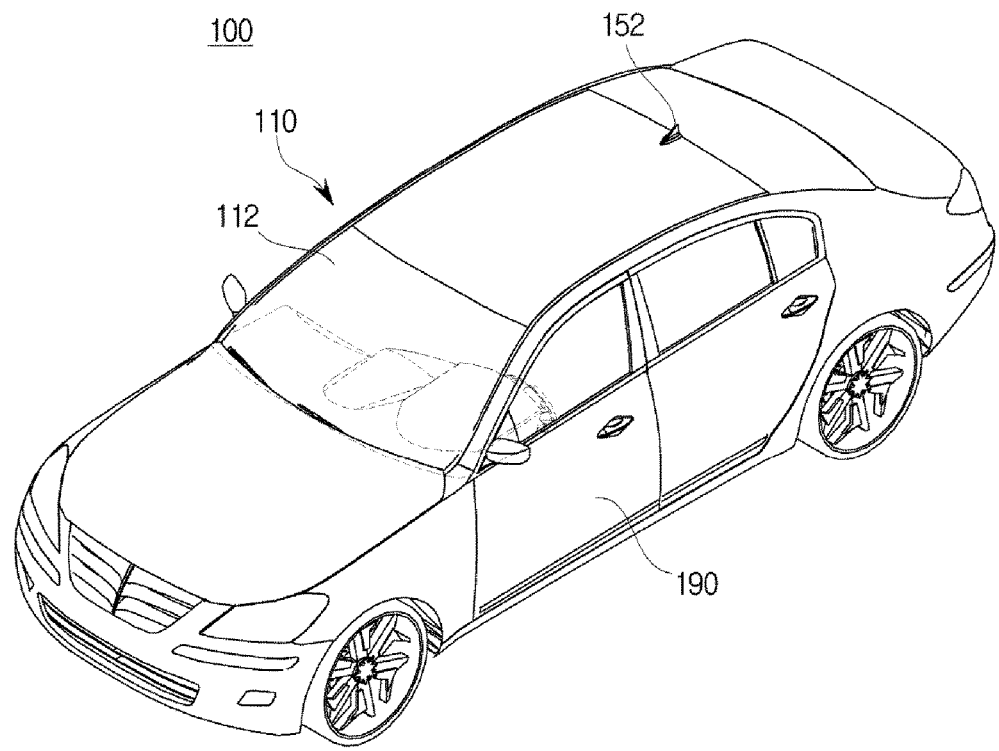
FIG. 1 is a view illustrating the exterior of a vehicle according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Reference will now be made in detail to the embodiments of the present disclosure, examples of which are illustrated in the accompanying drawings, wherein like reference numerals refer to like elements throughout.

FIG. 1 is a view illustrating the exterior of a vehicle 100 according to embodiments of the present disclosure. It should be understood that the exterior of the vehicle 100 as shown in FIG. 1 is provided merely for demonstration purposes, and should not be treated as limiting the scope of the present disclosure thereto.

As shown in FIG. 1, a windshield 112 arranged at a front upper portion of the main body 110 may provide a forward view of the vehicle to a vehicle driver who rides in the vehicle, and may protect the vehicle driver from the wind.

Doors 190 may be rotatably mounted to the left and right sides of the main body 110, so that a driver and passenger may easily ride in or leave the vehicle through the doors 190. When the doors 190 are closed, the doors 190 can shield the indoor space of the vehicle from the outside.

The antenna 152 may receive broadcast/communication signals, for example, telematics signal, DMB signal, digital TV signal, GPS signal, etc. The antenna 152 may be a multi-functional antenna configured to receive various kinds of broadcast/communication signals, or may be a single functional antenna configured to receive any one of broadcast/communication signals.

Figure 2:
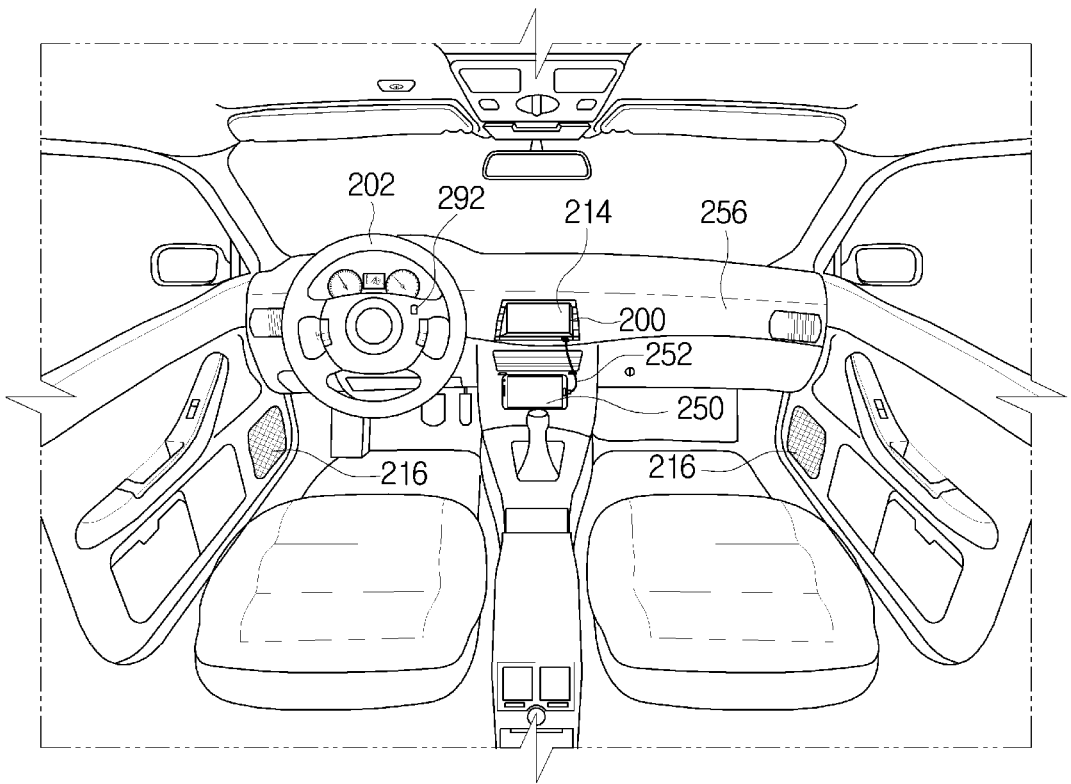
FIG. 2 is a view illustrating the interior of the vehicle shown in FIG. 1 according to embodiments of the present disclosure.

FIG. 2 is a view illustrating the interior of the vehicle shown in FIG. 1 according to embodiments of the present disclosure. It should be understood that the interior of the vehicle 100 as shown in FIG. 2 is provided merely for demonstration purposes, and should not be treated as limiting the scope of the present disclosure thereto.

As shown in FIG. 2, a dashboard 256 may include a plurality of electronic components needed for the vehicle driver who manipulates the vehicle 100, such that the vehicle driver who looks forward may manipulate various devices mounted to the dashboard 256 using the dashboard 256.

An audio-video-navigation (AVN) 200 may be a multimedia device for performing various multimedia functions according to a manipulation command of the vehicle driver and passengers. The AVN 200 may perform a navigation function for navigation, an audio function, and a video function. The AVN 200 may include a display 214 for displaying either information regarding the traveling road of the vehicle 100 or the route to a destination designed by the vehicle driver and passenger. In addition, the AVN 200 is electrically coupled to the speaker 216 so that the sound signal of the AVN 200 can be transferred to the speaker 216 and output through the speaker 216.

In addition, the AVN 200 may be connected to the mobile device 250 through wired communication such as a Universal Serial Bus (USB) cable 252. In addition, the AVN 200 may perform near field communication (NFC). The AVN 200 may perform NFC with the mobile device 250 of the registered passenger through the pairing method or the like.

As shown in FIG. 2, the mobile device 250 may be connected to the AVN 200 so as to communicate with the AVN 200. The mobile device 250 may include a portable communication/computing device such as a smartphone or tablet, and may include an external storage device, for example, an external hard disk drive (HDD), an external solid state drive (SSD), and a USB memory. In addition, an Internet of Things (IoT) device and a streaming service provider may be connected as the mobile devices to the AVN 200.

The steering wheel 202 may include an emergency call button 292. If the user manipulates the emergency call button 292, a voice call from the user is automatically connected to a telematics center (402 of FIG. 4) or other call centers, such that the user may ask for help from any of the centers.

Figure 3:
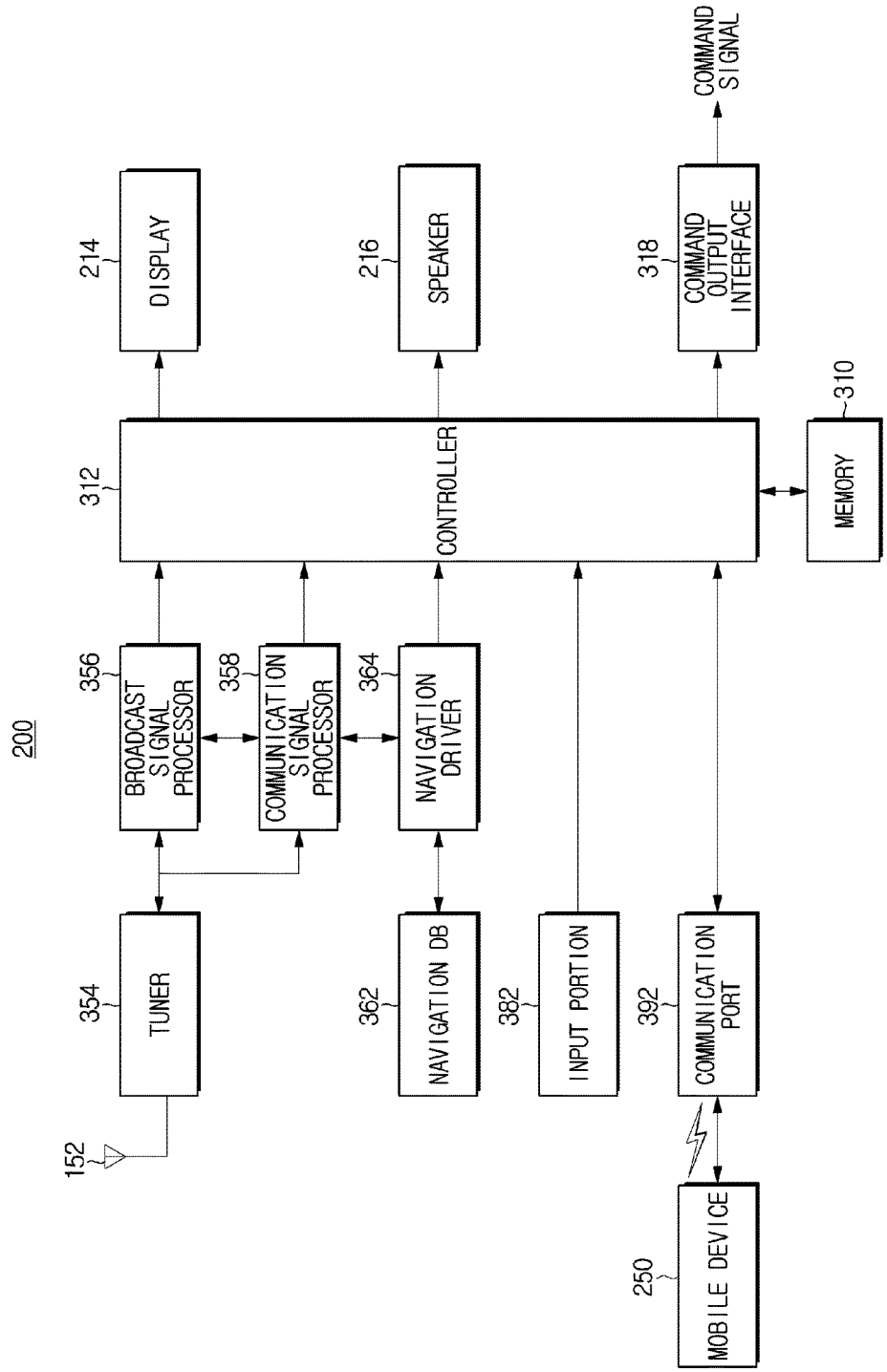
FIG. 3 is a block diagram illustrating a head unit of a vehicle according to embodiments of the present disclosure.

FIG. 3 is a block diagram illustrating a head unit of a vehicle according to embodiments of the present disclosure. As shown in FIG. 3, the AVN 200 of the vehicle 100 according to the embodiment may include the audio function, the video function, and the navigation function. Although the AVN 200 does not include all of the audio function, the video function, and the navigation function, the AVN 200 may be replaced with another head unit configured to support the car mirroring of the mobile device 250.

As can be seen from FIG. 3, the AVN 200 may be broadly classified into an element for the general input function, an element for the broadcast/communication function, an element for the navigation function, an element for the audio/video function, and an element commonly used in the plurality of functions.

The constituent element for the broadcast/communication function may include an antenna 152, a tuner 354, a broadcast signal processor 356, and a communication signal processor 358. The constituent element for the navigation function may include a navigation database (DB) 362 and a navigation driver 364. The elements commonly used in the plurality of functions may include a memory 310, a controller 312, a display 214, and a speaker 216. The above-mentioned functional division is not limited to the above-mentioned description, and any one functional element may also be used for other functions.

The antenna 152 may receive or transmit a radio frequency (RF) signal so as to receive a broadcast signal or as well as to transmit/receive a communication signal. The antenna 152 may be connected to the tuner 354 so as to communicate with the tuner 354. Therefore, the RF signal received from the antenna 152 may be transferred to the tuner 354. The antenna 152 may be comprised of a plurality of antennas configured to transceiver different types of broadcast/communication signals. The antenna 152 may also receive DMB broadcast signals, and may receive 2G/3G/LTE telematics signals. The telematics signals may include not only authentication data needed to update software of the vehicle 100 but also software images.

The tuner 354 may convert the radio frequency (RF) signal received from the antenna 152 into an intermediate frequency (IF) signal or the like. In addition, the tuner 354 may convert a data signal to be transmitted into a public signal capable of being propagated in the air, and may transmit the public signal to the air. That is, the tuner 354 may extract only the signal of a specific band, or may combine the data signal with a carrier signal. The tuner 354 may receive the broadcast signal, and may transmit and receive the communication signal. The broadcast signal may include a radio broadcast signal and a Digital Multimedia Broadcasting (DMB) broadcast signal. The communication signal may include a satellite communication signal related to a Global Positioning System (GPS). In addition, the communication signal may include a telematics communication signal.

The control signal transferred from the controller 312 to the tuner may determine information as to which signal will be received and processed by the tuner 354. For example, assuming that the controller 312 generates a control signal needed to receive a radio broadcast signal of a specific channel and outputs the control signal to the tuner 354, the tuner 354 may receive the radio broadcast signal of the corresponding channel in response to the control signal received from the controller 312. If the controller 312 transmits a control signal for transmitting the telematics signal and transmission (Tx) data to the tuner 354, the tuner 354 may convert the Tx data into a signal format capable of being transmitted over the air in response to the control signal from the controller 312, and may transmit the converted signal over the air through the antenna 152. In addition, the tuner 354 may acquire information regarding a broadcast channel contained in the broadcast signal. The broadcast signal applied to the tuner 354 may include a title of a broadcast channel, a service ID (identification), and broadcast data. The tuner 354 may extract the title of the broadcast channel, the service ID, and broadcast data contained in the broadcast signal, and may transmit the extracted information to the broadcast signal processor 356 and the controller 312.

The broadcast signal processor 356 may classify the broadcast signal generated from the tuner 354 into a video broadcast signal and an audio broadcast signal, and may perform a series of signal processing. The series of signal processing achieved by the broadcast signal processor 356 may include analog-to-digital conversion (ADC), and digital-to-analog conversion (DAC), and may include converting video data into a signal format capable of driving the display 214.

The communication signal processor 358 may perform processing of the communication signal with the GPS satellite and may perform processing of the telematics communication signal. That is, the communication signal processor 358 may convert the received communication signal into a data format capable of being transferred to the controller 312. The communication signal processor 358 may receive data to be transmitted from the tuner 354 and the antenna 152, and may convert the received data into a communicable signal format.

The navigation DB 362 may include data for implementing navigation. The navigation DB 362 may be a memory card or a Digital Versatile Disc (DVD) format. In addition, navigation data received from the mobile terminal connected to the wired/wireless link (e.g., Android® Auto) may also be used as the navigation DB.

The navigation driver 364 may construct a navigation screen image on the display 214 using data received from the navigation DB 362. For this purpose, navigation setting information, such as a destination, a waypoint, and a route type established by the passenger, may be received from the controller 312. In addition, for navigation implementation, current position information of the vehicle 100 obtained through communication with the GPS satellite may be received from the controller 312.

The input portion 382 may be at least one button mounted to the AVN 200, or a touchscreen implemented on the display 214. The passenger may select one of the multiple functions of the AVN 200 through manipulation of the input unit 382, and may perform various setting actions in a manner that a desired task can be performed from the selected function. The emergency call button 292 of the steering wheel 202 may be contained in the at least one button constructing the input portion 382.

For example, the communication port 392 may include a USB port, a FireWire port, or the like. A communication cable is inserted into the communication port 392, and the AVN 200 can be connected to the mobile device 250 connected to the communication cable, such that the AVN 200 can communicate with the mobile device 250. In addition, the communication port 392 may be implemented for short range wireless communication, for example, Bluetooth, Wi-Fi, ZigBee, NFC, etc. The communication port 392 for the short-range wireless communication may receive a remote control signal from the mobile device (e.g., smartphone, tablet, or the like) 250, and may transmit the received remote control signal to the controller 312 of the AVN 200 or another electronic control unit (ECU).

The controller 312 may perform necessary control in association with the overall operation of the AVN 200. For example, the controller 312 may process broadcast/communication signals. If A/V data generated after processing of the broadcast/communication signals must be output to the speaker 216 or the display 214, the corresponding A/V data is transferred to the speaker 216 or the display 214, such that necessary A/V data can be output. In addition, assuming that the passenger selects the navigation function, the controller 312 may control the navigation DB 362, the navigation driver 364, the display 214, and the speaker 216, resulting in implementation of navigation. In addition, the controller 312 may convert a title of a broadcast channel extracted from the broadcast signal into text data, and may transmit the converted title to the voice recognition processor 308. In addition, the controller 312 may update software of the vehicle 100. That is, the controller 250 may perform a variety of tasks needed to update software of the vehicle 100 using software image received from the telematics center (402 of FIG. 4) through the mobile device 250.

The memory 310 may store various applications needed to perform the broadcast/communication function, the navigation function, and the A/V function of the AVN 200, and may store screen display data needed to execute the applications, voice data, sound effect data, etc.

The display 214 may output video data needed when the multiple functions of the AVN 200 (e.g., the voice recognition function of the AVN 200, the broadcast/communication function, the navigation function, the A/V function, etc.) are performed. For example, information screen images, messages, video data, etc. of the respective functions may be output through the display 214. In addition, the display 214 may display a user interface (UI) for allowing the passenger to manipulate the plurality of functions of the AVN 200. For example, the user interface (UI) needed for the user who desires to perform the navigation function, the broadcast (radio/DMB) function, the air-conditioning function, and the other audio function of the AVN 200 may be displayed on the display 214.

The speaker 216 may output audio data needed when multiple functions of the AVN 200 (e.g., the voice recognition function, the broadcast/communication function, the navigation function, and the A/V function) are performed.

For example, voice messages, the sound effect, and audio data of the respective functions may be output through the speaker 216.

Figure 4A:
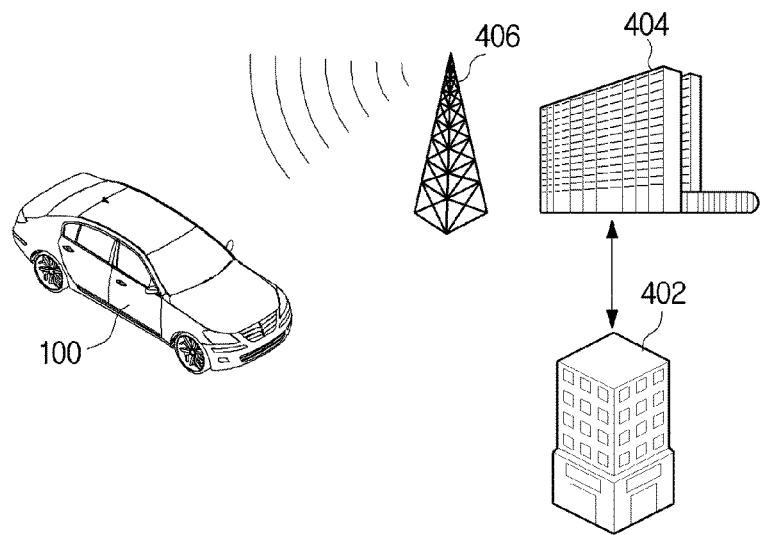
FIGS. 4A and 4B are diagrams illustrating a telematics system of a vehicle according to embodiments of the present disclosure.
Figure 4B:
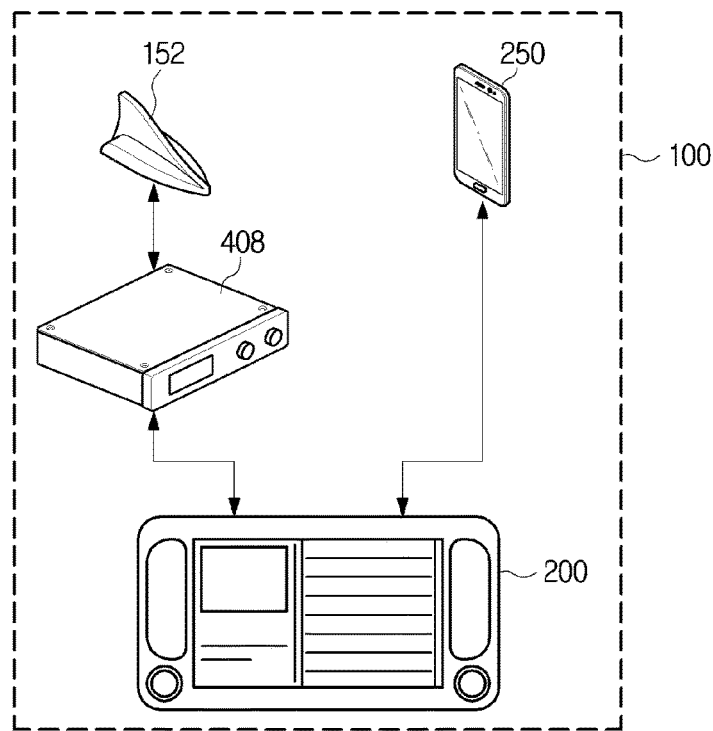

FIGS. 4A and 4B are diagrams illustrating a telematics system of a vehicle according to embodiments of the present disclosure.

As shown in FIG. 4A, the vehicle 100 may communicate with a telematics center (hereinafter referred to as a "TMS center") through a telematics unit (hereinafter referred to as a "TMS unit") 408. The TMS unit 408 may implement various wireless communication schemes, and may receive GPS signals from GPS satellites.

As shown in FIG. 4B, the TMS unit 408 of the vehicle 100 is connected to a wireless communication base station (BS) 406 installed by a communication enterprise 404 through the antenna 152. Wireless communication using the TMS unit 408 may be basically needed to provide various communication services, for example, voice communication, e-mail, Internet, voice memo, etc.

In addition, the vehicle 100 registered in the TMS service may receive various content from the TMS center 402 through the communication enterprise 404. In more detail, if an affiliated content provision enterprise provides various content through the TMS center, the TMS center may provide the corresponding content to the TMS service registered vehicle 100 through a wireless communication network. For example, content capable of being provided through the TMS service may include various services, for example, traffic information, living information, robbery detection, accident notification, navigation, etc.

A current position of the vehicle 100 may be recognized by the GPS signal received from the GPS satellite. The position of vehicle 100, as determined by the GPS signal, may be used to recognize a current position of the vehicle 100 during the navigation service.

The TMS unit 408 may be communicably connected to the AVN 200 of the vehicle 100. The AVN 200 may receive or transmit data from or to the TMS center 402 through the TMS unit 408. For example, when an emergency call signal occurs, the AVN 200 may transmit the emergency call signal to the TMS center 402 through the TMS unit 408 and the antenna 115, and the TMS center 402 may take necessary measures. The emergency call signal generated from the vehicle 100 may also be transmitted to other designated call centers instead of the TMS center 402 as necessary. In addition, communication between the AVN 200 and the TMS center 402 (or the other call center) may also be achieved through the mobile device 250 directly connected to the AVN 200 as shown in FIG. 4B.

The vehicle 100 according to embodiments of the present disclosure may regularly update a network coverage information DB of a communication system. If the user generates the emergency call signal by manipulating the emergency call button 292 during traveling of the vehicle 100, the communication network is automatically switched to another so as to prevent communication interruption as necessary. For example, when the vehicle 100 enters a heterogeneous network coverage region when the emergency call signal occurs during traveling (i.e., when the vehicle 100 moves from an LTE network coverage region to a 3D network coverage region), the emergency call signal may be interrupted. A method for controlling the vehicle 100 according to the embodiment of the present disclosure may perform automatic switching of the communication network so as to continuously generate the emergency call signal even in the heterogeneous network coverage region, such that communication interruption may not occur although the vehicle enters the heterogeneous network coverage region in the event of emergency call occurrence. For this purpose, the network coverage information DB is previously constructed and updated, and the vehicle automatically switches to the network coverage region having no communication interruption when the emergency call signal occurs, resulting in prevention of communication interruption.

A method for automatically switching and controlling the communication network when the emergency call signal occurs will hereinafter be described with reference to FIGS. 5 to 9.

Figure 5:
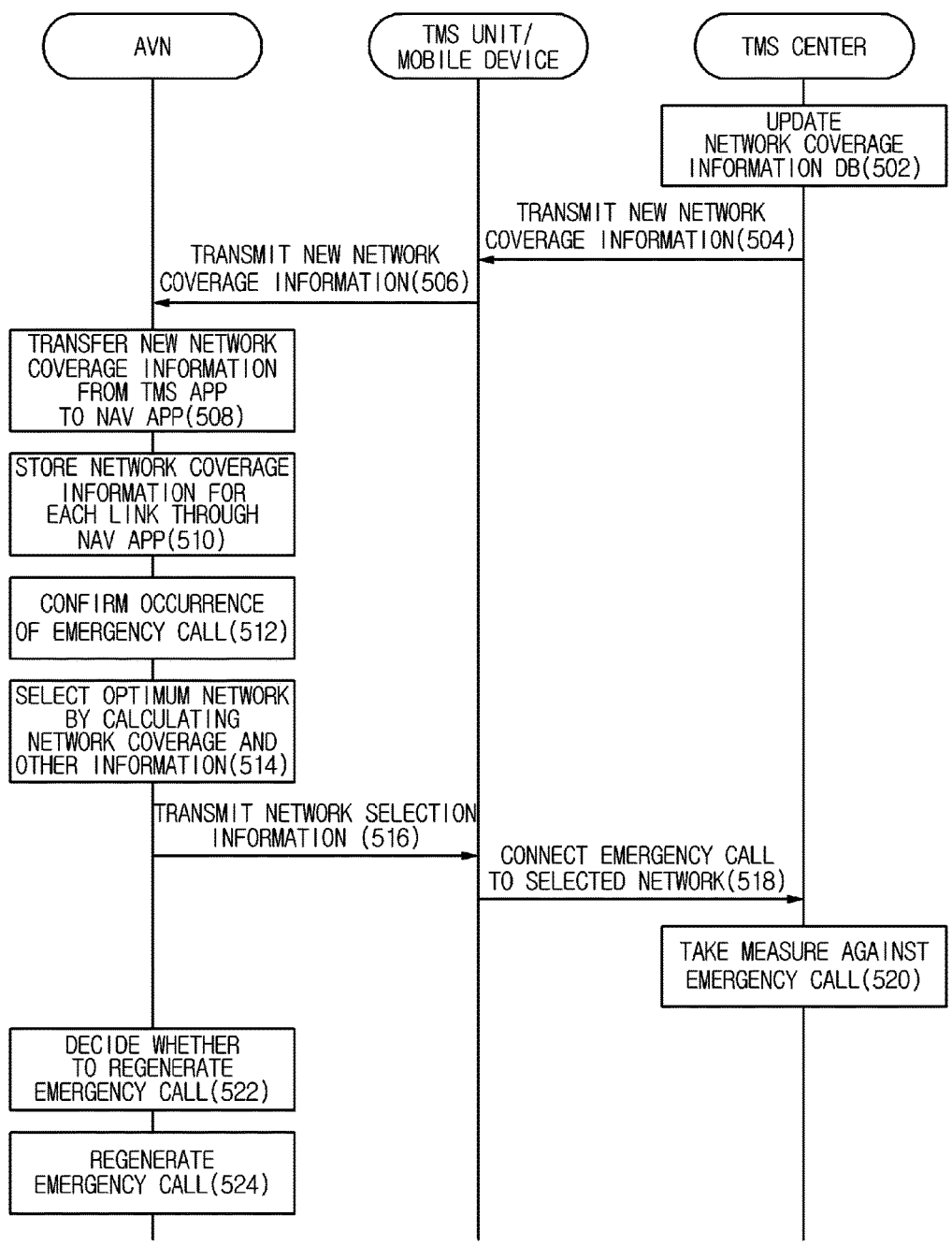
FIG. 5 is a flowchart illustrating a method for controlling the vehicle according to embodiments of the present disclosure.

FIG. 5 is a flowchart illustrating a method for controlling the emergency call signal generated from the vehicle according to embodiments of the present disclosure. As shown in FIG. 5, switching a communication network can prevent communication interruption when the vehicle 100 outputs the emergency call signal while traveling.

The control method illustrated in FIG. 5 may be achieved by communication among the AVN 200, the TMS unit 408, and the TMS center 402 as shown in FIGS. 4A and 4B, or may be achieved by communication among the AVN 200, the mobile device 250, and the TMS center 402. The AVN 200 may include a telematics (TMS) application for utilizing the TMS system and a navigation application for utilizing the navigation system.

First, the TMS center 402 may regularly update the network coverage information DB (Operation 502). That is, the TMS center 402 may periodically receive network coverage information from the communication enterprise 404, and may store the received network coverage information in a DB.

If the TMS center 402 receives new network coverage information from the communication enterprise 404, the TMS center 402 may transmit the received network coverage information to the AVN 200 through the TMS unit 408 or the mobile device 250 (Operations 504 and 506). In this case, transmission of the network coverage information may include collecting a predetermined number of updated network coverage information units, and simultaneously transmitting the collected updated network coverage information. Alternatively, the network coverage information may be simultaneously transmitted whenever single new network coverage information is updated.

When the AVN 200 receives new network coverage information, the AVN 200 may transfer the received new network coverage information from the TMS application to the navigation application (Operation 508). In a navigation mode, the AVN 200 may refer to a route to a destination so as to perform automatic switching of the communication network, such that there is a need for the navigation application to acquire new network coverage information.

The navigation application may store network coverage information for each link on the map (Operation 510). FIG. 6 is a table illustrating resultant values that are numerically changed and mapped for each link on a travel route on a navigation map. As shown in FIG. 6, map numerical expression for either the 2G/3G network region or the LTE network region in every link (Link 1, Link 2, . . . Link N) is performed according to a predetermined reference, such that the numerical expression resultant value is stored.

Referring back to FIG. 5, when the user who rides in the vehicle 100 attempts to send the emergency call signal (i.e., when the emergency call button 292 of the vehicle 100 is manipulated) (Operation 512), the controller 312 of the AVN 200 may confirm the emergency call signal, may calculate at least one parameter relating to network coverage and may select an optimum communication network based on the calculated parameter(s) (Operation 514). For example, in order to select the optimum network, the at least one calculated parameter may refer to at least one of: i) a network electric field value corresponding to the current position of the vehicle 100, ii) numerical expression information of the network coverage map, and iii) a traveling direction and average speed of the traveling vehicle 100. Specifically, when the map numerical expression information (ii) of the network coverage is acquired, an estimated position to be acquired after lapse of a predetermined time may be predicted, such that network selection is performed on the basis of the predicted position information.

For example, assuming that the network related to a predicted spot at which the vehicle 100 will be located after lapse of 1 minute from a current time is the 2G/3G network, the emergency call signal may be generated by selecting the 2G/3G network even at the current position of the vehicle 100, such that the 2G/3G network may be successively used without interruption of the emergency call signal after lapse of 1 minute. Assuming that the network related to a spot at which the vehicle 100 will be located after lapse of 1 minute is the LTE network, the emergency call signal may be generated by selecting the LTE network even at the current position of the vehicle 100, such that the LTE network may be successively used without interruption of the emergency call signal after lapse of 1 minute. For this purpose, from among the network coverage map numerical data illustrated in FIG. 6, a communication network in which the network coverage map numerical value is not zero '0' may be primarily selected. If the communication network in which the network coverage map numerical value is zero '0' is not present, a communication network having a maximum average value may be selected.

If the communication network is selected in operation 514 of FIG. 5, the AVN 200 may transmit information regarding the selected communication network to the TMS unit 408 or the mobile device 250 (Operation 516).

The TMS unit 408 or the mobile device 250 may connect the emergency call signal to the TMS center 402 (or a designated call center) through the selected communication network (Operation 518).

A person in charge in the TMS center 402 (or the designated call center) may receive the emergency call from the vehicle 100, may listen to content of an emergency situation, and may take action against the emergency situation (Operation 520). For example, assuming that the emergency situation is occurrence of a crime or burglary, the person in charge in the TMS center 402 calls 112 (or 911 in the USA) so that police may be dispatched to the emergency scene. Assuming that the emergency situation is occurrence of an accident or injured person, the person in charge in the TMS center 402 calls 119 (or 911 in the USA) so that an ambulance or emergency rescue vehicle may be sent to the emergency scene.

While the emergency call occurs and the user of the vehicle 100 is talking to the person in charge of the TMS center 402, if a call connection between the user of the vehicle and the TMS center 402 is interrupted due to communication network problems, the AVN 200 may determine whether to resend the emergency call (Operation 522). If there is a need to resend the emergency call, the AVN 200 may resend the emergency call (Operation 524).

Figure 7:
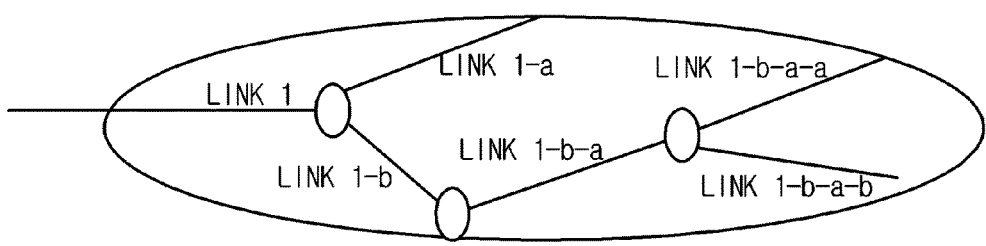
FIG. 7 is a conceptual diagram illustrating a method for using link information for selecting a communication network for an emergency call during an unused time of a navigation service according to embodiments of the present disclosure.

FIG. 7 is a conceptual diagram illustrating a method for using link information for selecting a communication network for an emergency call during an unused time of a navigation service according to embodiments of the present disclosure. As shown in FIG. 7, when the vehicle 100 does not use the navigation service, the vehicle 100 may select the communication network by referring to link information illustrated in FIG. 7.

While the vehicle 100 does not use the navigation service of the AVN 200, it is impossible to predict which route will be used as a travel route of the vehicle 100, such that the overall link to be branched from a link corresponding to a current position of the vehicle 100 can be predicted on the basis of the movable distance. The vehicle 100 may calculate an average network coverage value that is numerically expressed on the basis of the overall link, and may perform network selection mentioned in operation 514 of FIG. 5 on the basis of the average network coverage value. Here, a region not supporting the network is not selected.

Figure 8:
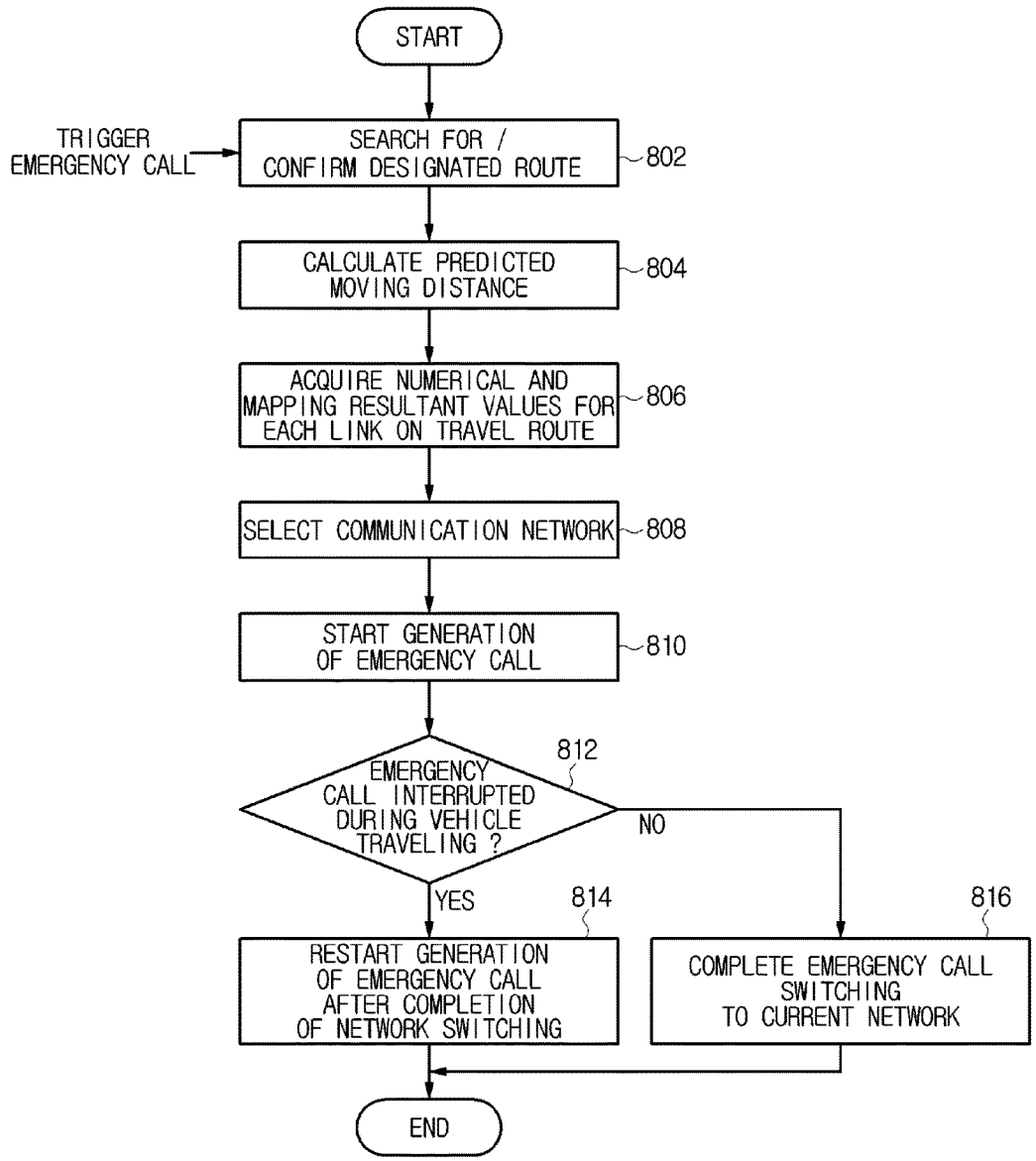
FIG. 8 is a flowchart illustrating a method for controlling an emergency call of a vehicle according to embodiments of the present disclosure.

FIG. 8 is a flowchart illustrating a method for controlling an emergency call of a vehicle according to embodiments of the present disclosure.

As shown in FIG. 8, a user may execute a navigation service (e.g., route guidance) of the vehicle 100. The controller 312 of the AVN 200 may search for and confirm a route to a user-desired destination (Operation 802).

The controller 312 of the AVN 200 may calculate a predicted moving distance to the destination (Operation 804).

As previously stated in FIG. 6, the controller 312 of the AVN 200 may store resultant values that are numerically changed and mapped for each link on a travel route on a navigation map (Operation 806).

The controller 312 may calculate network coverage and other information on the basis of the numerical and mapping resultant values, and may select an optimum communication network on the basis of the calculation result (Operation 808).

If the user manipulates the emergency call button 292 to generate the emergency call signal, emergency telephone conversation between the user and the TMS center is achieved by the above-mentioned operations illustrated in FIG. 5 (Operation 810).

If the emergency call is abruptly interrupted while the vehicle is in motion because the communication network problems occurs during emergency telephone conversation between the user of the vehicle and the TMS center (Operation 812), the communication network is switched to another network in the same manner as in FIGS. 5 and 6, and the controller 312 may regenerate the emergency call signal (Operation 814).

In contrast, if interruption of the emergency call does not occur (Operation 812), the controller 312 completely sends the emergency call signal to the current network (Operation 816).

Figure 9:
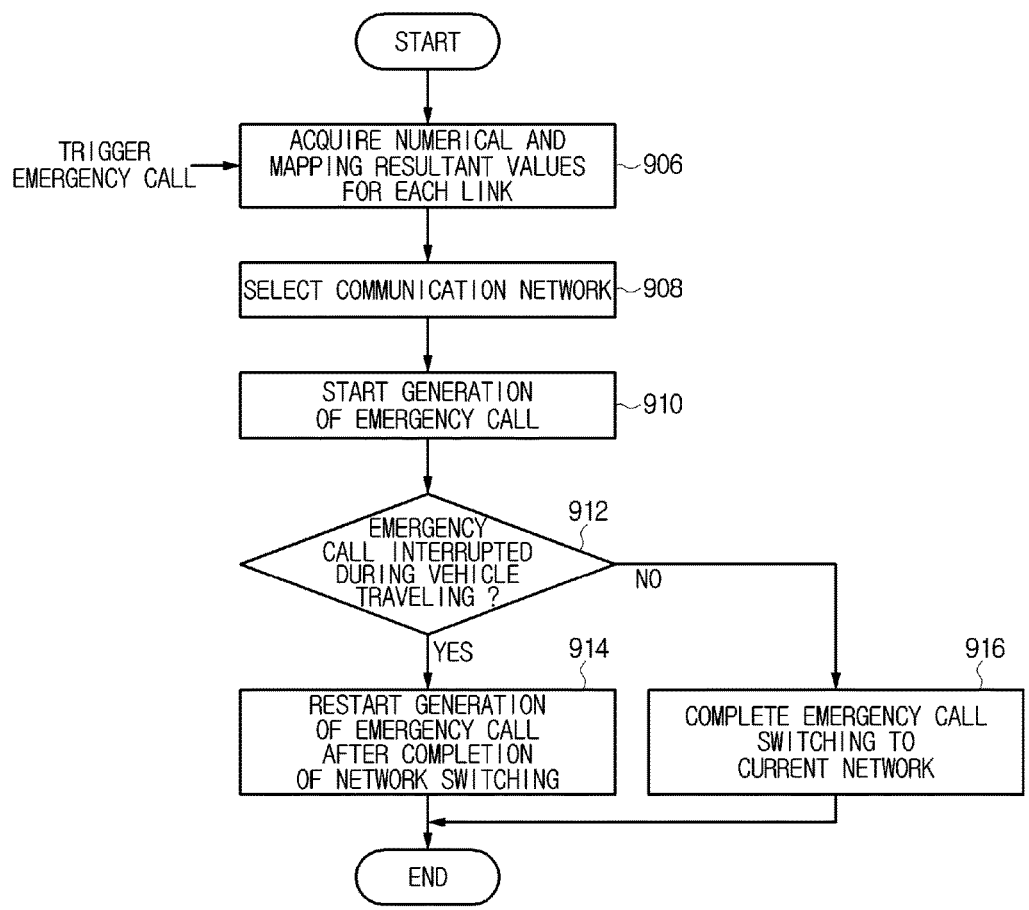
FIG. 9 is another flowchart illustrating a method for controlling an emergency call of a vehicle according to embodiments of the present disclosure.

FIG. 9 is another flowchart illustrating a method for controlling an emergency call of a vehicle according to embodiments of the present disclosure. The emergency call control method shown in FIG. 9 discloses the case in which the user does not use the navigation service of the vehicle 100. Differently from the control method of FIG. 8, the control method of FIG. 9 does not use the navigation service, such that the control method is unable to refer to a travel route displayed on the navigation system.

Here, network selection may be achieved using the numerical resultant values mentioned in FIG. 7. As can be seen from FIG. 7, the controller 312 of the AVN 200 is unable to predict which route will be used as a travel route of the vehicle 100 when the navigation service of the AVN 200 is not used, such that the controller 312 may predict the overall link to be branched from the link of the current position on the basis of the movable distance. The controller 312 may calculate an average network coverage value that is numerically expressed on the basis of the overall movable link, and may select the network to be used to generate the emergency call on the basis of the average network coverage value (Operation 908).

The controller 312 of the AVN 200 may calculate network coverage and other information on the basis of the numerical and mapping resultant values, and may select an optimum communication network on the basis of the calculation result (Operation 908).

If the user manipulates the emergency call button 202 to generate the emergency call signal, emergency telephone conversation between the user and the TMS center is achieved by the above-mentioned operations illustrated in FIG. 5 (Operation 910).

If the emergency call is abruptly interrupted while the vehicle is in motion because the communication network problems occurs during emergency telephone conversation between the user of the vehicle and the TMS center (Operation 912), the communication network is switched to another network in the same manner as in FIGS. 5 and 7, and the controller 312 may regenerate the emergency call signal (Operation 914).

In contrast, if interruption of the emergency call does not occur (Operation 912), the controller 312 completely sends the emergency call signal to the current network (Operation 916).

As is apparent from the above description, the vehicle having the emergency call system according to embodiments of the present disclosure effectively selects and changes a communication network even when the vehicle connected to the emergency call system is traveling, resulting in prevention of emergency call interruption.

Although select embodiments of the present disclosure have been shown and described, it would be appreciated by those skilled in the art that changes may be made in these embodiments without departing from the principles and spirit of the present disclosure, the scope of which is defined in the claims and their equivalents.

What is claimed is:

1. A method for controlling an emergency call signal generated from a vehicle, the method comprising:
acquiring network coverage information of a plurality of communication networks;
storing the network coverage information for each link in a map of a navigation device installed in the vehicle;
calculating at least one parameter for selecting a communication network needed to maintain continuity of the emergency call signal when an emergency call button of the vehicle is manipulated;
selecting a communication network needed to maintain continuity of the emergency call signal based on the at least one calculated parameter; and
connecting the emergency call signal through the selected communication network, wherein
the at least one parameter is at least one of: a network electric field value of a current position of the vehicle, a numerical value of a network coverage map, a travel direction of the vehicle, and an average speed of the vehicle, and
the selecting of the communication network needed to maintain continuity of the emergency call signal comprises selecting a communication network having a non-zero numerical value of the network coverage map.

2. The method according to claim 1, further comprising:
when no communication network having a non-zero numerical value of the network coverage map is present, selecting a communication network having a maximum average value of the numerical value of the network coverage map.

3. The method according to claim 1, wherein the selecting of the communication network needed to maintain continuity of the emergency call signal comprises:
when the navigation device provides a navigation service to a destination, selecting a communication network through numerical and mapping resultant values for each link in the map of the navigation device along a travel route directed by the navigation device.

4. The method according to claim 1, wherein the selecting of the communication network needed to maintain continuity of the emergency call signal comprises:
when the navigation device does not provide a navigation service to a destination, predicting a future position of the vehicle after lapse of a predetermined time based on a current position of the vehicle; and
selecting a communication network through numerical and mapping resultant values for each link in the map of the navigation device at the predicted future position.

5. The method according to claim 1, further comprising:
regenerating the emergency call signal when a telephone conversation resulting from the emergency call signal is interrupted.

6. A vehicle comprising:
a navigation device including a controller and providing a navigation service; and
a telematics unit enabling wireless communication with the vehicle, wherein
the controller acquires network coverage information of a plurality of communication networks, stores the network coverage information for each link in a map of the navigation device, calculates at least one parameter for selecting a communication network needed to maintain continuity of an emergency call signal generated by the vehicle when an emergency call button of the vehicle is manipulated, selects a communication network needed to maintain continuity of the emergency call signal based on the at least one calculated parameter, and connects the emergency call signal through the selected communication network,
the at least one parameter is at least one of: a network electric field value of a current position of the vehicle, a numerical value of a network coverage map, a travel direction of the vehicle, and an average speed of the vehicle, and
the controller selects a communication network having a non-zero numerical value of the network coverage map.

7. The vehicle according to claim 6, wherein:
when no communication network having a non-zero numerical value of the network coverage map is present, the controller selects a communication network having a maximum average value of the numerical value of the network coverage map.

8. The vehicle according to claim 6, wherein:
when the navigation device provides a navigation service to a destination, the controller selects a communication network through numerical and mapping resultant values for each link in the map of the navigation device along a travel route directed by the navigation device.

9. The vehicle according to claim 6, wherein:
when the navigation device does not provide a navigation service to a destination, the controller predicts a future position of the vehicle after lapse of a predetermined time based on a current position of the vehicle, and selects a communication network through numerical and mapping resultant values for each link in the map of the navigation device at the predicted future position.

10. The vehicle according to claim 6, wherein the controller regenerates the emergency call signal when a telephone conversation resulting from the emergency call signal is interrupted.

11. A method for controlling an emergency call signal generated from a vehicle, the method comprising:
acquiring network coverage information of a plurality of communication networks;
storing the network coverage information for each link in a map of a navigation device installed in the vehicle;
calculating at least one parameter for selecting a communication network needed to maintain continuity of the emergency call signal when an emergency call button of the vehicle is manipulated;
selecting a communication network needed to maintain continuity of the emergency call signal based on the at least one calculated parameter;
connecting the emergency call signal through the selected communication network; and
regenerating the emergency call signal when a telephone conversation resulting from the emergency call signal is interrupted,
wherein the at least one parameter is at least one of: a network electric field value of a current position of the vehicle, a numerical value of a network coverage map, a travel direction of the vehicle, and an average speed of the vehicle, and
wherein the selecting of the communication network needed to maintain continuity of the emergency call signal comprises selecting a communication network having a non-zero numerical value of the network coverage map.

12. A vehicle comprising:
a navigation device including a controller and providing a navigation service; and
a telematics unit enabling for wireless communication with the vehicle,
wherein the controller acquires network coverage information of a plurality of communication networks, stores the network coverage information for each link in a map of the navigation device, calculates at least one parameter for selecting a communication network needed to maintain continuity of an emergency call signal generated by the vehicle when an emergency call button of the vehicle is manipulated, selects a communication network needed to maintain continuity of the emergency call signal based on the at least one calculated parameter, connects the emergency call signal through the selected communication network, and regenerates the emergency call signal when a telephone conversation resulting from the emergency call signal is interrupted, wherein the at least one parameter is at least one of: a network electric field value of a current position of the vehicle, a numerical value of a network coverage map, a travel direction of the vehicle, and an average speed of the vehicle, and
wherein the controller selects a communication network having a non-zero numerical value of the network coverage map.

* * * * *